(12) United States Patent
Han et al.

(10) Patent No.: US 12,103,112 B2
(45) Date of Patent: Oct. 1, 2024

(54) METHOD AND SYSTEM FOR PREDICTING CRITICAL FLOATING TIME OF REINFORCING PHASE

(71) Applicant: Tianjin University, Tianjin (CN)

(72) Inventors: Yongdian Han, Tianjin (CN); Yuan Li, Tianjin (CN); Lianyong Xu, Tianjin (CN); Lei Zhao, Tianjin (CN); Kangda Hao, Tianjin (CN); Hongyang Jing, Tianjin (CN)

(73) Assignee: Tianjin University, Tianjin (CN)

( * ) Notice: Subject to any disclaimer, the term of this patent is extended or adjusted under 35 U.S.C. 154(b) by 249 days.

(21) Appl. No.: 17/859,442

(22) Filed: Jul. 7, 2022

(65) Prior Publication Data
US 2023/0062703 A1 Mar. 2, 2023

Related U.S. Application Data

(63) Continuation of application No. PCT/CN2021/140905, filed on Dec. 23, 2021.

(30) Foreign Application Priority Data

Aug. 23, 2021 (CN) .......................... 202110965558.3

(51) Int. Cl.
*B23K 31/12* (2006.01)
*B23K 31/02* (2006.01)
*B23K 103/16* (2006.01)

(52) U.S. Cl.
CPC ............ *B23K 31/125* (2013.01); *B23K 31/02* (2013.01); *B23K 2103/16* (2018.08)

(58) Field of Classification Search
CPC ... B23K 31/125; B23K 31/02; B23K 2103/16
See application file for complete search history.

(56) References Cited

U.S. PATENT DOCUMENTS

| 6,138,779 | A | * | 10/2000 | Boyce | .................. | B23K 35/327 |
| | | | | | | 175/425 |
| 2021/0229120 | A1 | * | 7/2021 | Ueda | .................... | B05B 17/0615 |
| 2022/0156437 | A1 | * | 5/2022 | Belfort | .................... | B01D 67/00 |

FOREIGN PATENT DOCUMENTS

| CN | 102513720 | * | 6/2012 |
| CN | 105643148 | * | 6/2016 |
| CN | 107584185 | * | 1/2018 |
| CN | 109609805 | * | 4/2019 |
| CN | 112222671 | * | 1/2021 |

* cited by examiner

*Primary Examiner* — Helen C Kwok
(74) *Attorney, Agent, or Firm* — Hawaii Patent Services; Nathaniel K. Fedde; Kenton N. Fedde (57) ABSTRACT

The present disclosure relates to a method and system for predicting the critical floating time of a reinforcing phase. According to the method, a particle concentration processing model, a half-life processing model, an agglomeration kinetics model, and a floating time processing model are combined to obtain the critical floating time of a reinforcing phase particle according to an initial particle size of the reinforcing phase particle, a density of the reinforcing phase particle, a mass fraction of the reinforcing phase of a composite soldering material, and a density of the composite soldering material. The method and system can accurately predict the critical floating time of the reinforcing phase particle.

10 Claims, 5 Drawing Sheets

```
┌─────────────────────────────────────────────────────────┐
│ Obtain an initial density of a reinforcing phase particle, an initial │
│ particle size of the reinforcing phase particle, a mass fraction of the │──── 101
│ reinforcing phase of a composite soldering material, a density of the │
│ composite soldering material, a viscosity coefficient of the │
│ composite soldering material, and a density of the reinforcing phase │
│ particle │
└─────────────────────────────────────────────────────────┘
                              ↓
┌─────────────────────────────────────────────────────────┐
│ Obtain, by a particle concentration processing model, an initial │
│ concentration of the reinforcing phase particle according to the │──── 102
│ initial particle size of the reinforcing phase particle, the density of │
│ the reinforcing phase particle, the mass fraction of the reinforcing │
│ phase of the composite soldering material, and the density of the │
│ composite soldering material │
└─────────────────────────────────────────────────────────┘
                              ↓
┌─────────────────────────────────────────────────────────┐
│ Obtain, by a half-life processing model, half-life of the reinforcing │
│ phase particle according to the initial concentration of the reinforcing │──── 103
│ phase particle and the viscosity coefficient of the composite soldering │
│ material │
└─────────────────────────────────────────────────────────┘
                              ↓
┌─────────────────────────────────────────────────────────┐
│ Obtain, by using an agglomeration kinetics model, a particle size of a │
│ reinforcing phase agglomerated particle according to the half-life of │──── 104
│ the reinforcing phase particle and the initial particle size of the │
│ reinforcing phase particle │
└─────────────────────────────────────────────────────────┘
                              ↓
┌─────────────────────────────────────────────────────────┐
│ Obtain, by a floating time processing model, the critical floating time │
│ of the reinforcing phase according to the particle size of the │
│ reinforcing phase agglomerated particle, the viscosity coefficient of │──── 105
│ the composite soldering material, the density of the composite │
│ soldering material, and the density of the reinforcing phase particle │
└─────────────────────────────────────────────────────────┘
```

METHOD AND SYSTEM FOR PREDICTING CRITICAL FLOATING TIME OF REINFORCING PHASE

TECHNICAL FIELD

The present disclosure relates to the field of soldering, in particular to a method and system for predicting the critical floating time of a reinforcing phase.

BACKGROUND

With the development of electronic devices towards miniaturization and high density, the reliability of solder joints for important connecting components is becoming more and more demanding. The addition of strengthening phases to common solder alloy is an effective way to improve the reliability of solder joints, but the added reinforcing phases often suffer from light weight and poor wettability with the solder alloy. In the process of welding or liquid processing, the solder alloy is squeezed out due to surface tension and buoyancy, which greatly weakens the strengthening effect of the composite soldering materials, and even deteriorates the performance of the soldering materials due to particle agglomeration.

The existing studies tend to suppress the agglomeration and floating of the reinforcing phase by reducing the addition amount of the reinforcing phase or modifying the surface of the reinforcing phase, but these methods have little effect due to the lack of theoretical understanding of the agglomeration and floating behavior of the reinforcing phase.

SUMMARY

The present disclosure is to provide a method and system for predicting the critical floating time of a reinforcing phase, which can accurately predict the critical floating time of the reinforcing phase.

To achieve the above purpose, the present disclosure provides the following solutions:

A method for predicting the critical floating time of a reinforcing phase, comprising:

obtaining an initial particle size of a reinforcing phase particle, a mass fraction of the reinforcing phase of a composite soldering material, a density of the composite soldering material, a viscosity coefficient of the composite soldering material, and a density of the reinforcing phase particle;

obtaining, by using a particle concentration processing model, an initial concentration of the reinforcing phase particle according to the initial particle size of the reinforcing phase particle, the density of the reinforcing phase particle, the mass fraction of the reinforcing phase of the composite soldering material, and the density of the composite soldering material;

obtaining, by using a half-life processing model, half-life of the reinforcing phase particle according to the initial concentration of the reinforcing phase particle and the viscosity coefficient of the composite soldering material;

obtaining, by using an agglomeration kinetics model, a particle size of a reinforcing phase agglomerated particle according to the half-life of the reinforcing phase particle and the initial particle size of the reinforcing phase particle; and obtaining, by a floating time processing model, the critical floating time of the reinforcing phase according to the particle size of the reinforcing phase agglomerated particle, the viscosity coefficient of the composite soldering material, the density of the composite soldering material, and the density of the reinforcing phase particle.

Optionally, the particle concentration processing model is shown as $n_0 = 6\omega[(1-\omega)\delta + \omega\rho]/(\pi\rho d_0^3)$, wherein $n_0$ is the initial concentration of the reinforcing phase particle, $\omega$ is the mass fraction of the reinforcing phase of the composite soldering material, $\delta$ is the density of the composite soldering material (in other words, $\delta$ is a density of a substrate of the composite soldering material), $\rho$ is the density of the reinforcing phase particle, $d_0$ is the initial particle size of the reinforcing phase particle, and $\pi$ is a ratio of circumference to diameter.

Optionally, the half-life processing model is shown as $$\tau = \frac{3\mu}{4kTn_0},$$

wherein $\tau$ is the half-life of the reinforcing phase particle, $\mu$ is the viscosity coefficient of the composite soldering material, k is a Boltzmann constant, and T is a liquid processing temperature.

Optionally, the agglomeration kinetics model is shown as $d = d_0 \times [1+(t/\tau)]^{1/3}$, where d is the particle size of the reinforcing phase agglomerated particle, and t is time.

Optionally, the floating time processing model is shown as $$t_c = \frac{27RT\mu}{\pi g^2 d^5 (\delta - \rho)^2 N_A},$$

wherein $t_c$ is the critical floating time, R is a molar gas constant, g is a gravity acceleration, and $N_A$ is an Avogadro's constant.

A system for predicting the critical floating time of a reinforcing phase, comprising:

an acquisition unit used for obtaining an initial particle size of a reinforcing phase particle, a mass fraction of the reinforcing phase of a composite soldering material, a density of the composite soldering material, a viscosity coefficient of the composite soldering material, and a density of the reinforcing phase particle;

an initial concentration processing unit used for obtaining, by using a particle concentration processing model, an initial concentration of the reinforcing phase particle according to the initial particle size of the reinforcing phase particle, the density of the reinforcing phase particle, the mass fraction of the reinforcing phase of the composite soldering material, and the density of the composite soldering material;

a half-life processing unit used for obtaining, by using a half-life processing model, half-life of the reinforcing phase particle according to the initial concentration of the reinforcing phase particle and the viscosity coefficient of the composite soldering material;

a particle size processing unit used for obtaining, by using an agglomeration kinetics model, a particle size of a reinforcing phase agglomerated particle according to the half-life of the reinforcing phase particle and the initial particle size of the reinforcing phase particle; and a critical floating time processing unit used for obtaining, by a floating time processing model, the critical floating time of the reinforcing phase according to the particle size of the reinforcing phase agglomerated particle, the viscosity coefficient of the composite soldering material, the density of the composite soldering material, and the density of the reinforcing phase particle.

Optionally, the particle concentration processing model is shown as $n_0=6\omega[(1-\omega)\delta+\omega\rho]/(\pi\rho d_0^3)$, wherein $n_0$ is the initial concentration of the reinforcing phase particle, co is the mass fraction of the reinforcing phase of the composite soldering material, $\delta$ is the density of the composite soldering material, p is the density of the reinforcing phase particle, and $d_0$ is the initial particle size of the reinforcing phase particle.

Optionally, the half-life processing model is shown as $$\tau = \frac{3\mu}{4kTn_0},$$

wherein $\tau$ is the half-life of the reinforcing phase particle, $\mu$ is the viscosity coefficient of the composite soldering material, k is a Boltzmann constant, and T is a liquid processing temperature.

Optionally, the agglomeration kinetics model is shown as $d=d_0\times[1+(t/\tau)]^{1/3}$, where d is the particle size of the reinforcing phase agglomerated particle, and t is time.

Optionally, the floating time processing model is shown as $$t_c = \frac{27RT\mu}{\pi g^2 d^5 (\delta - \rho)^2 N_A},$$

wherein $t_c$ is the critical floating time, R is a molar gas constant, g is a gravity acceleration, and $N_A$ is an Avogadro's constant.

According to the specific embodiments provided according to the present disclosure, the present disclosure has the following technical effects:

The inventor of the present disclosure has found that the existing studies tend to suppress the agglomeration and floating of the reinforcing phase by reducing the addition amount of the reinforcing phase or modifying the surface of the reinforcing phase, but these methods are not in line with the fundamental solution proposed from the perspective of thermodynamics and kinetics.

The present disclosure provides a method and system for predicting the critical floating time of a reinforcing phase in a composite soldering material. The technical solution fully considers the influence of the agglomeration and floating behaviors of the reinforcing phase on soldering, can accurately predict the critical floating time of a reinforcing phase particle, provides theoretical support for suppressing the agglomeration and floating of the strengthening phase, and has important significance to the promotion and application of the reinforced composite soldering material.

BRIEF DESCRIPTION OF THE DRAWINGS

In order to more clearly illustrate embodiments of the present disclosure or technical solutions in the prior art, the following is a brief introduction of the accompanying drawings required to be used in the embodiments. Obviously, the drawings in the following description are only some embodiments described in the present disclosure, and those ordinary skills in the art may also obtain other drawings based on these drawings without creative efforts.

FIG. 3 is a flow chart of a method for predicting the critical floating time of a reinforcing phase provided according to the present disclosure;

DETAILED DESCRIPTION

The following is a clear and complete description of the technical solutions in the embodiments of the present disclosure in combination with the accompanying drawings in the embodiments of the present disclosure. Obviously, the described embodiments are only a part of, not all of, the embodiments of the present disclosure. All other embodiments obtained by those ordinary skills in the art based on the embodiments of the present disclosure without creative effort shall fall into the protection scope of the present disclosure.

In this patent document, the accompanying drawings described below and the embodiments used to describe the principles of the present disclosure are for illustration purposes only, and should not be construed to limit the scope of the present disclosure. It will be understood by those skills in the art that the principles of the present disclosure may be implemented in any properly arranged system. Exemplary embodiments will be described in detail, examples of which are illustrated in the accompanying drawings. The terms used in the specification of the present disclosure are merely used to describe specific embodiments, and are not intended to illustrate the concepts of the present disclosure.

The present disclosure is to provide a method and system for predicting the critical floating time of a reinforcing phase, which accurately predict the critical floating time of a reinforcing phase particle, provide theoretical support for suppressing the agglomeration and floating of the strengthening phase, and lay a foundation for the promotion and application of a reinforced composite soldering material.

The reinforcing phase may also be referred to herein as the strengthening phase. Materials such as metal particles, intermetallic compound particles, ceramic particles or carbon materials with proper volume fraction or mass fraction are added into a common alloy soldering material to be used as a reinforcing body for strengthening the performance of the soldering material. These added particulate materials are the strengthening phase.

Suitable reinforcing phases may be, for example, carbon-based nanomaterials such as graphene, carbon nanotubes, and fullerenes, which are difficult to wet with a substrate material.

In order to make the above purposes, features and advantages of the present disclosure more clearly understood, the present disclosure will be described in further detail below with reference to the accompanying drawings and specific embodiments.

Figure 1:
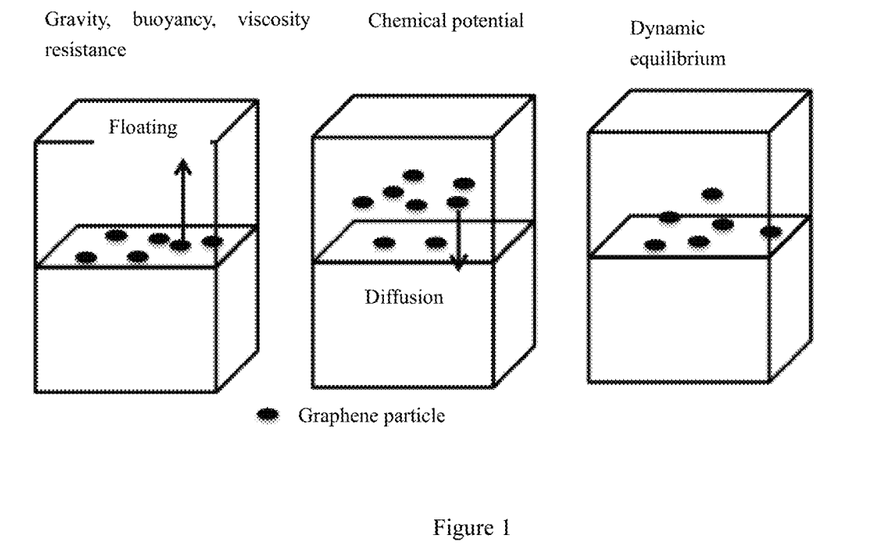
FIG. 1 is a schematic diagram of a physical model of floating and Brownian motion of nanoparticles in a molten soldering material established according to the present disclosure.

According to the present disclosure, firstly, a schematic diagram of a physical model of floating and Brownian motion of nanoparticles in a molten soldering material as shown in FIG. 1 is established, the molten nanoparticles are regarded as colloids or suspension systems, and under the action of molecular thermal motion, the nanoparticles in the molten soldering material make a random Brownian motion, collide, and agglomerate under the action of a Van der Waals potential, increasing the sizes of the particles; and at this moment, it is necessary to analyze the stress of the nanoparticle reinforcing phase in the molten soldering material: in the vertical direction, the reinforcing phase is subjected to gravity and buoyancy, once it moves, it is also subjected to viscosity resistance opposite to a velocity direction, and when equilibrium is reached, a steady-state floating velocity $v_f$ will be generated; and once the nanoparticles deviate from the equilibrium position and float up, a concentration difference will be generated in a local area, that is, a chemical potential, the direction of the chemical potential points to the original equilibrium position, and when the concentration difference reaches a certain level, diffusion to the original equilibrium position will occur, and the essence of diffusion is that the Brownian motion of the particles under the action of external forces is directed, generating a Brownian velocity $v_B$.

The floating velocity can be expressed as $$v_f = \frac{g d_0^2 (\delta - \rho)}{18\mu},$$

and the Brownian velocity can be expressed as $$v_B = \frac{d\lambda}{dt} = \frac{1}{2}\sqrt{\frac{RT}{3\pi t \mu d_0 N_A}},$$

where g is the gravity acceleration, $d_0$ is the initial particle size of the reinforcing phase particle, $\delta$ is the density of the composite solder, $\rho$ is the density of the reinforcing phase particle, $\mu$ is the viscosity coefficient of the composite soldering material, $\lambda$ is an average displacement of Brownian motion, R is a molar gas constant, T is a liquid processing temperature, t is time, and $N_A$ is an Avogadro constant.

Figure 2:
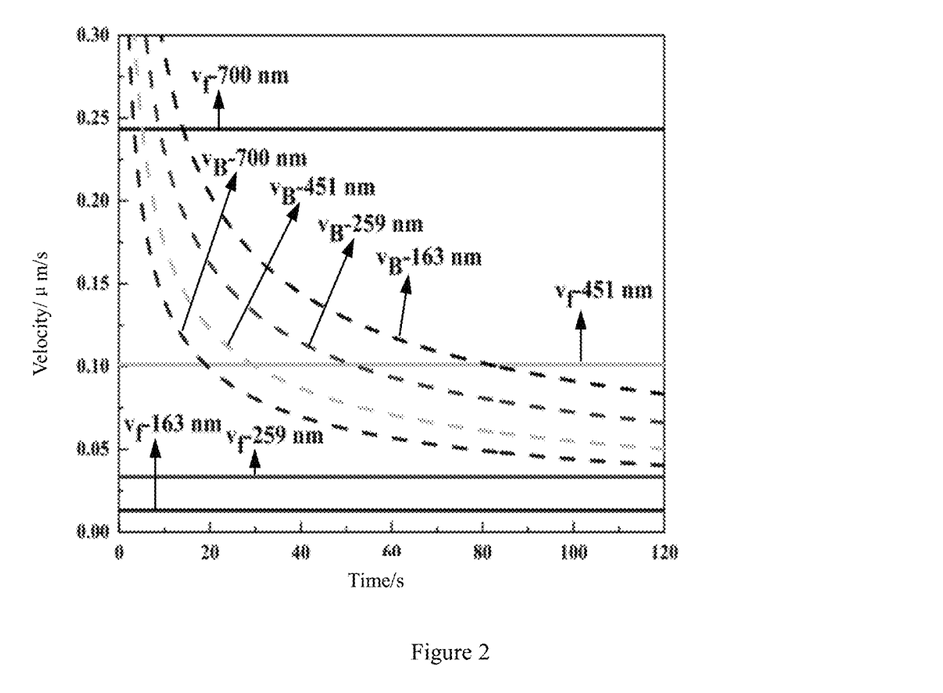
FIG. 2 is a graph showing the contrast between a floating velocity and a Brownian velocity of a reinforcing phase with different initial particle sizes.

According to the relationship between the floating velocity and the time and the relationship between the Brownian velocity and the time, a graph showing the contrast between the floating velocity and the Brownian velocity of a reinforcing phase with different initial particle sizes as shown in FIG. 2 is drawn. In the FIG., there is an intersection point between the floating velocity and the Brownian velocity of a particle with a particle size of 700 nm, and there is an intersection point between the floating velocity and the Brownian velocity of a particle with a particle size of 451 nm, which is the critical floating time.

A method for predicting the critical floating time of a reinforcing phase provided according to the present disclosure shown in FIG. 3 specifically includes:

S101: an initial particle size of a reinforcing phase particle, a mass fraction of the reinforcing phase of a composite soldering material, a density of the composite soldering material, a viscosity coefficient of the composite solder, and a density of the reinforcing phase particle are obtained;

S102: an initial concentration of the reinforcing phase particle is obtained by using a particle concentration processing model according to the initial particle size of the reinforcing phase particle, the density of the reinforcing phase particle, the mass fraction of the reinforcing phase of the composite soldering material, and the density of the composite soldering material;

S103: half-life of the reinforcing phase particle is obtained by using a half-life processing model according to the initial concentration of the reinforcing phase particle and the viscosity coefficient of the composite soldering material;

S104: a particle size of a reinforcing phase agglomerated particle is obtained by using an agglomeration kinetics model according to the half-life of the reinforcing phase particle and the initial particle size of the reinforcing phase particle; and S105: the critical floating time of the reinforcing phase is obtained by a floating time processing model according to the particle size of the reinforcing phase agglomerated particle, the viscosity coefficient of the composite soldering material, the density of the composite soldering material, and the density of the reinforcing phase particle.

It can be seen from the above steps that the present disclosure considers the influence of the agglomeration of the reinforcing phase on the floating behavior in the floating process, provides a theoretical support for suppressing the agglomeration and floating of the strengthening phase, and lays a foundation for the promotion and application of the reinforced composite soldering material.

Specifically, the particle concentration processing model is shown as $n_0 = 6\omega[(1-\omega)\delta + \omega\rho]/(\pi\rho d_0^3)$, where $n_0$ is the initial concentration of the reinforcing phase particle, $\omega$ is the mass fraction of the reinforcing phase of the composite soldering material, $\delta$ is the density of the composite soldering material, $\rho$ is the density of reinforcing phase particle, and $d_0$ is the initial particle size of the reinforcing phase particle. The the half-life processing model is shown as $$\tau = \frac{3\mu}{4kTn_0},$$

where $\tau$ is the half-life of the reinforcing phase particle, $\mu$ is the viscosity coefficient of the composite soldering material, k is the Boltzmann constant, and T is the liquid processing temperature. The agglomeration kinetic model is shown as $d = d_0 \times [1+(t/\tau)]^{1/3}$ where d is the particle size of the reinforcing phase agglomerated particle, and t is the time. The floating time processing model is shown as $$t_c = \frac{27 RT\mu}{\pi g^2 d^5 (\delta - \rho)^2 N_A},$$

where $t_c$ is the critical floating time, R is the molar gas constant, g is the acceleration of gravity, and $N_A$ is the Avogadro's constant.

Through the processing of the above multiple models, the floating kinetics model considering the agglomeration of the reinforcing phase can be obtained as follows:

$$t_c = \frac{27RT\mu}{\pi g^2 d_0^5 [1+(t_c/\tau)]^{5/3}(\delta-\rho)^2 N_A},$$

and the critical floating time can be quickly and accurately predicted by using the model.

Figure 4:
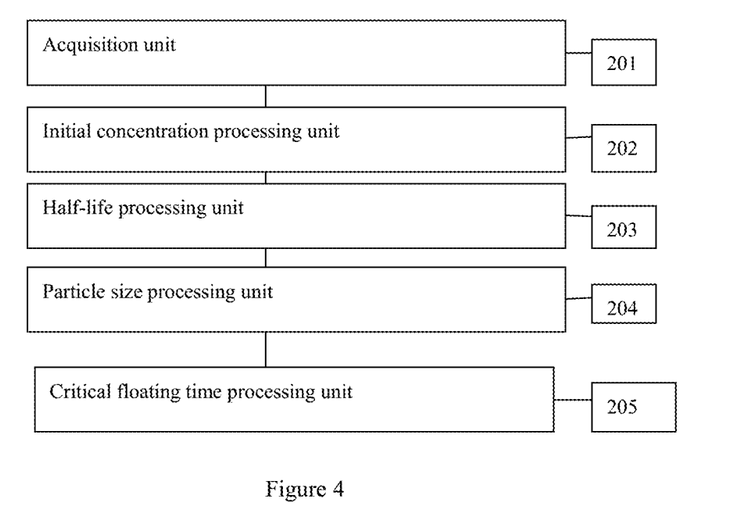
FIG. 4 is a schematic diagram of a system for predicting the critical floating time of a reinforcing phase provided according to the present disclosure.

The present disclosure also provides a system, corresponding to the method, for predicting the critical floating time of a reinforcing phase. As shown in FIG. 4, the system includes an acquisition unit 201, an initial concentration processing unit 202, a half-life processing unit 203, a particle size processing unit 204, and a critical floating time processing unit 205.

The acquisition unit 201 is used for obtaining an initial particle size of a reinforcing phase particle, a mass fraction of a reinforcing phase of a composite soldering material, a density of the composite soldering material, a viscosity coefficient of the composite soldering material, and a density of the reinforcing phase particle;

The initial concentration processing unit 202 is used for obtaining, by using a particle concentration processing model, an initial concentration of the reinforcing phase particle according to the initial particle size of the reinforcing phase particle, the density of the reinforcing phase particle, the mass fraction of the reinforcing phase of the composite soldering material, and the density of the composite soldering material;

The half-life processing unit 203 is used for obtaining, by using a half-life processing model, half-life of the reinforcing phase particle according to the initial concentration of the reinforcing phase particle and the viscosity coefficient of the composite soldering material;

The particle size processing unit 204 is used for obtaining, by using an agglomeration kinetics model, a particle size of a reinforcing phase agglomerated particle according to the half-life of the reinforcing phase particle and the initial particle size of the reinforcing phase particle; and The critical floating time processing unit 205 is used for obtaining, by a floating time processing model, the critical floating time of the reinforcing phase according to the particle size of the reinforcing phase agglomerated particle, the viscosity coefficient of the composite soldering material, the density of the composite soldering material, and the density of the reinforcing phase particle.

Specifically, the particle concentration processing model is shown as $n_0=6\omega[(1-\omega)\delta+\omega\rho]/(\pi\rho d_0^3)$, where $n_0$ is the initial concentration of the reinforcing phase particle, $\omega$ is the mass fraction of the reinforcing phase of the composite soldering material, $\delta$ is the density of the composite soldering material, $\rho$ is the density of reinforcing phase particle, and $d_0$ is the initial particle size of the reinforcing phase particle. The half-life processing model is shown as $\tau=3\mu/4kTn_0$, where $\tau$ is the half-life of the reinforcing phase particle, $\mu$ is the viscosity coefficient of the composite soldering material, k is the Boltzmann constant, and T is the liquid processing temperature. The agglomeration kinetic model is shown as $d=d_0\times[1+(t/\tau)]^{1/3}$ where d is the particle size of the reinforcing phase agglomerated particle, and t is the time. The floating time processing model is shown as $$t_c = \frac{27RT\mu}{\pi g^2 d^5(\delta-\rho)^2 N_A},$$

where $t_c$ is the critical floating time, R is the molar gas constant, g is the gravity acceleration, and $N_A$ is the Avogadro's constant. The floating kinetics model considering the agglomeration of the reinforcing phase can be also finally obtained as follows $$t_c = \frac{27RT\mu}{\pi g^2 d_0^5 [1+(t_c/\tau)]^{5/3}(\delta-\rho)^2 N_A}$$

in the system, which is convenient for predicting the critical floating time.

In order to verify the practicability of the technical solution, graphene with an initial particle size of 163 to 451 nm is used as a reinforcing phase to predict the critical floating time in the graphene (GNSs) reinforced tin-silver-copper (SAC)-based composite solder (GNSs/SAC) with a mass fraction ω of 0.05%.

Figure 5:
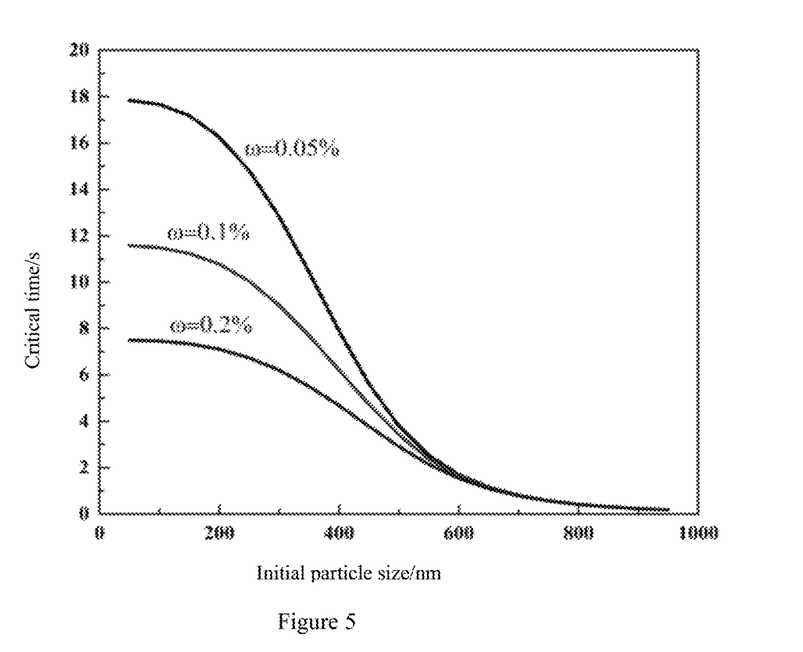
FIG. 5 is a graph of a critical floating time kinetics model considering graphene agglomeration.

When the relevant parameters in Table 1 are processed by using the floating kinetics model of the present disclosure considering the agglomeration of the reinforcing phase, a graph of a critical floating time kinetics model considering graphene agglomeration as shown in FIG. 5 is obtained.

TABLE 1

| Parameters Required for Critical Floating Time Kinetics Model | | | | | | | | |
|---|---|---|---|---|---|---|---|---|
| R | μ (Pa × s) | $d_0$(nm) | δ(g/cm3) | ρ (g/cm3) | $N_A$ | k (J/K) | T (K) | ω |
| 8.314 | 0.0056 | 169-451 | 7.414 | 2.25 | $6.02'10^{-23}$ | $1.38'10^{-23}$ | 523 | 0.05-0.2% |

The GNSs/SAC alloy soldering material was cut by wire cutting and ground to 15*7*0.18 mm³ flakes, and the flakes were heated at 190 to 250 with a heating rate of 3° C./min. In the process, in-situ X-ray two-dimensional imaging experiments were carried out to quantitatively analyze the floating behavior of graphene and verify the critical floating time model.

Figure 6:
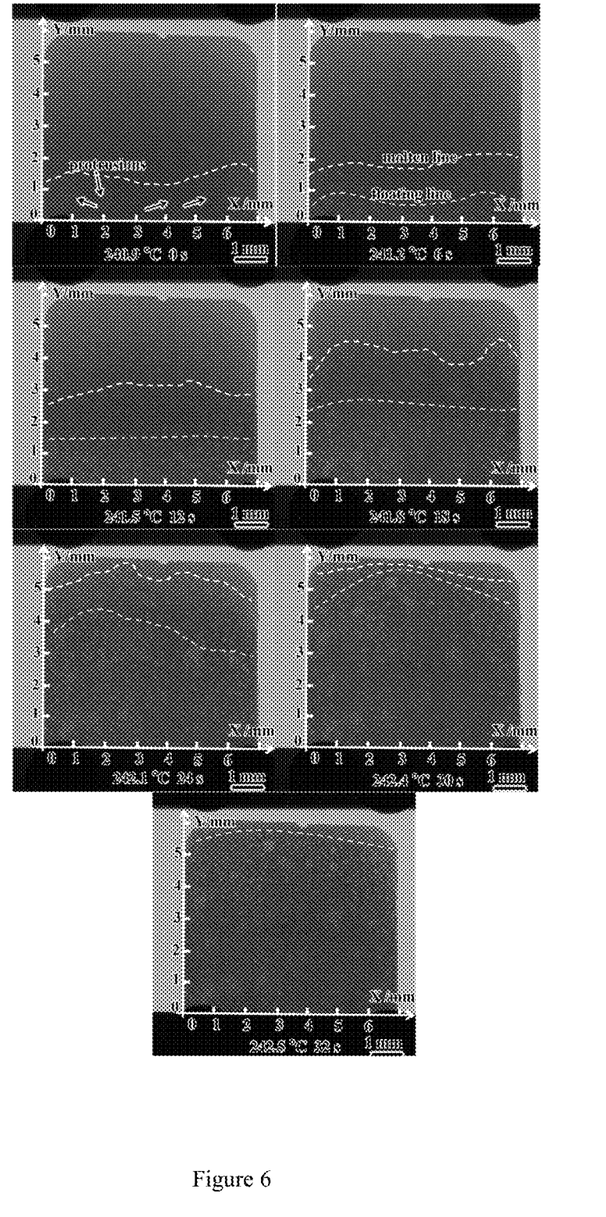
FIG. 6 is a schematic diagram of X-ray representing the agglomeration and floating of graphene in a molten composite soldering material.
Figure 7:
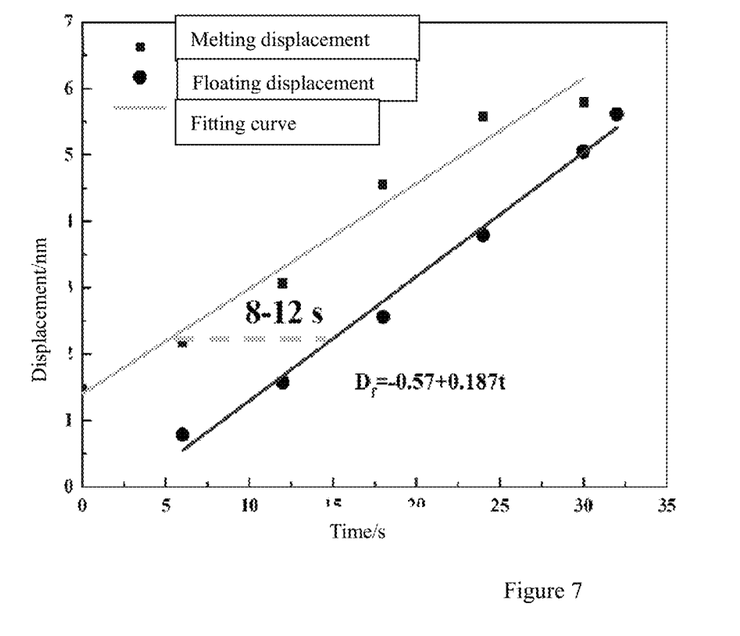
FIG. 7 is a schematic diagram of an X-ray verification critical floating time model for quantitatively representing the floating of graphene.
Figure 8:
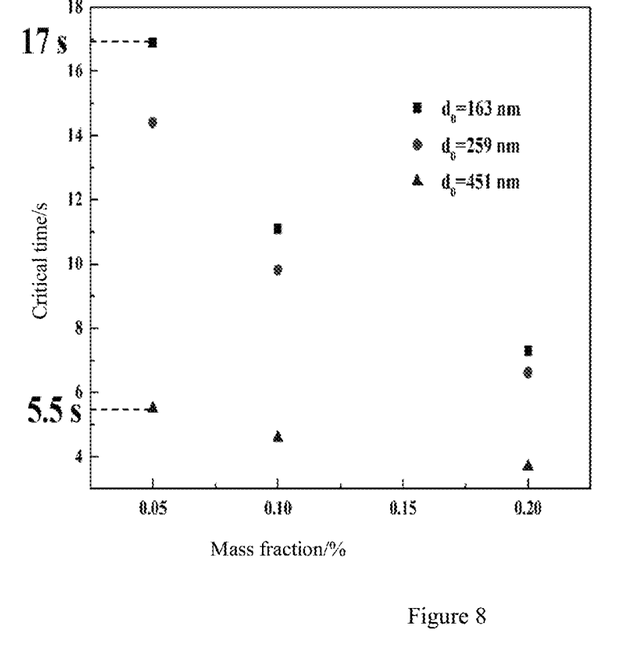
FIG. 8 is a schematic diagram of critical floating time verification in an X-ray verification critical floating time model.

FIG. 6 shows a schematic diagram of X-ray representing the agglomeration and floating of graphene in a molten composite soldering material, from which it can be seen that the substrate has a black contrast, and the graphene has a small density and a bright white contrast. With the increase of temperature, light-colored protrusions and wrinkles begin to appear in the uniform black substrate, which is considered to be a sign of complete melting, as shown by the white dotted line in the FIG., and as time passes by, a bright white line gradually rises from the bottom, which is the floating line of graphene. After processing a two-dimensional image, the displacement ($D_f$)-time curve quantitatively representing the floating of graphene in FIG. 7 can be obtained, and it can be seen from the FIG. that there is an obvious time difference between melting and floating, which is about 8 to 12 s. Compared with the critical floating time of 0.05 ωt. % GNSs/SAC in FIG. 8, it can be seen that the time difference just falls within the time range of 5.5 to 17 s calculated in the critical floating time kinetics model of the present disclosure, thus verifying the correctness of the floating kinetics model of the reinforcing phase in the molten nano-composite soldering material.

Various embodiments in this specification are described in a progressive manner, and each embodiment focuses on the differences from other embodiments, and the same and similar portions of various embodiments can be referred to each other. For the system disclosed in the embodiment, since it corresponds to the method disclosed in the embodiment, the description is relatively simple, and the reference may be made to the description of the method for the related portion.

The principles and embodiments of the present disclosure have been described herein with reference to specific examples. The description of the above embodiments is only for the purpose of helping to understand the method and core idea of the present disclosure. Meanwhile, for those skills in the art, there may be changes in the specific embodiments and application scope according to the idea of the present disclosure. In view of that above, the content of the specification should not be construed to limit the present disclosure.

The invention claimed is:

1. A method for predicting a critical floating time of a reinforcing phase, comprising:
obtaining an initial particle size of a reinforcing phase particle, a mass fraction of the reinforcing phase of a composite soldering material, a density of the composite soldering material, a viscosity coefficient of the composite soldering material, and a density of the reinforcing phase particle;
obtaining, by using a particle concentration processing model, an initial concentration of the reinforcing phase particle according to the initial particle size of the reinforcing phase particle, the density of the reinforcing phase particle, the mass fraction of the reinforcing phase of the composite soldering material, and the density of the composite soldering material;
obtaining, by using a half-life processing model, half-life of the reinforcing phase particle according to the initial concentration of the reinforcing phase particle and the viscosity coefficient of the composite soldering material;
obtaining, by using an agglomeration kinetics model, a particle size of a reinforcing phase agglomerated particle according to the half-life of the reinforcing phase particle and the initial particle size of the reinforcing phase particle; and
obtaining, by a floating time processing model, the critical floating time of the reinforcing phase according to the particle size of the reinforcing phase agglomerated particle, the viscosity coefficient of the composite soldering material, the density of the composite soldering material, and the density of the reinforcing phase particle.

2. The method for predicting the critical floating time of the reinforcing phase according to claim 1, wherein the particle concentration processing model is shown as $n_0=6\omega[(1-\omega)\delta+\omega\rho]/(\pi\rho d_0^3)$, wherein $n_0$ is the initial concentration of the reinforcing phase particle, $\omega$ is the mass fraction of the reinforcing phase of the composite soldering material, $\delta$ is the density of the composite soldering material, $\rho$ is the density of the reinforcing phase particle, and $d_0$ is the initial particle size of the reinforcing phase particle.

3. The method for predicting the critical floating time of the reinforcing phase according to claim 2, wherein the half-life processing model is shown as $$\tau = \frac{3\mu}{4kTn_0},$$

wherein $\tau$ is the half-life of the reinforcing phase particle, $\mu$ is the viscosity coefficient of the composite soldering material, k is a Boltzmann constant, and T is a liquid processing temperature.

4. The method for predicting the critical floating time of the reinforcing phase according to claim 3, wherein a formula of the agglomeration kinetics model is shown as $d=d_0\times[1+(t/\tau)]^{1/3}$, where d is the particle size of the reinforcing phase agglomerated particle, and t is time.

5. The method for predicting the critical floating time of the reinforcing phase according to claim 4, wherein the floating time processing model is shown as $$t_c = \frac{27RT\mu}{\pi g^2 d^5 (\delta-\rho)^2 N_A},$$

wherein $t_c$ is the critical floating time, R is a molar gas constant, g is a gravity acceleration, and $N_A$ is an Avogadro's constant.

6. A system for predicting a critical floating time of a reinforcing phase, comprising:
an acquisition unit used for obtaining an initial particle size of a reinforcing phase particle, a mass fraction of the reinforcing phase of a composite soldering material, a density of the composite soldering material, a viscosity coefficient of the composite soldering material, and a density of the reinforcing phase particle;
an initial concentration processing unit used for obtaining, by using a particle concentration processing model, an initial concentration of the reinforcing phase particle according to the initial particle size of the reinforcing phase particle, the density of the reinforcing phase particle, the mass fraction of the reinforcing phase of the composite soldering material, and the density of the composite soldering material;
a half-life processing unit used for obtaining, by using a half-life processing model, half-life of the reinforcing phase particle according to the initial concentration of the reinforcing phase particle and the viscosity coefficient of the composite soldering material;
a particle size processing unit used for obtaining, by using an agglomeration kinetics model, a particle size of a reinforcing phase agglomerated particle according to the half-life of the reinforcing phase particle and the initial particle size of the reinforcing phase particle; and
a critical floating time processing unit used for obtaining, by a floating time processing model, the critical floating time of the reinforcing phase according to the particle size of the reinforcing phase agglomerated particle, the viscosity coefficient of the composite soldering material, the density of the composite soldering material, and the density of the reinforcing phase particle.

7. The system for predicting the critical floating time of the reinforcing phase according to claim 6, wherein the particle concentration processing model is shown as: $n_0=6\omega[(1-\omega)\delta+\omega\rho]/(\pi\rho d_0^3)$, wherein no is the initial concentration of the reinforcing phase particle, $\omega$ is the mass fraction of the reinforcing phase of the composite soldering material, δ is the density of the composite soldering material, ρ is the density of the reinforcing phase particle, and $d_0$ is the initial particle size of the reinforcing phase particle.

8. The system for predicting the critical floating time of the reinforcing phase according to claim 7, wherein the half-life processing model is shown as:

$$\tau = \frac{3\mu}{4kTn_0},$$

wherein τ is the half-life of the reinforcing phase particle, μ is the viscosity coefficient of the composite soldering material, k is a Boltzmann constant, and T is a liquid processing temperature.

9. The system for predicting the critical floating time of the reinforcing phase according to claim 8, wherein the agglomeration kinetics model is shown as: $d=d_0\times[1+(t/\tau)]^{1/3}$, where d is the particle size of the reinforcing phase agglomerated particle, and t is time.

10. The system for predicting the critical floating time of the reinforcing phase according to claim 9, wherein the floating time processing model is shown as $$t_c = \frac{27RT\mu}{\pi g^2 d^5 (\delta - \rho)^2 N_A},$$

wherein $t_c$ is the critical floating time, R is a molar gas constant, g is a gravity acceleration, and $N_A$ is an Avogadro's constant.

* * * * *